(12) United States Patent
Montalban

(10) Patent No.: US 10,534,195 B2
(45) Date of Patent: Jan. 14, 2020

(54) REMOVABLE ELASTIC HINGE FOR EYEGLASS FRAMES

(71) Applicant: VISOTTICA INDUSTRIE S.p.A., Susegana (IT)

(72) Inventor: Rinaldo Montalban, Susegana (IT)

(73) Assignee: VISOTTICA INDUSTRIE S.P.A., Susegana (IT)

( * ) Notice: Subject to any disclaimer, the term of this patent is extended or adjusted under 35 U.S.C. 154(b) by 0 days.

(21) Appl. No.: 16/170,382

(22) Filed: Oct. 25, 2018

(65) Prior Publication Data

US 2019/0129201 A1 May 2, 2019

(30) Foreign Application Priority Data

Oct. 26, 2017 (IT) .................. 102017000121879

(51) Int. Cl.
*G02C 5/22* (2006.01)

(52) U.S. Cl.
CPC ............. *G02C 5/2236* (2013.01); *G02C 5/22* (2013.01); *G02C 5/2218* (2013.01); *G02C 5/2227* (2013.01); *G02C 5/2245* (2013.01); *Y10T 16/526* (2015.01)

(58) Field of Classification Search
CPC ...... G02C 5/22; G02C 5/2218; G02C 5/2227; G02C 5/2236; G02C 5/2245; Y10T 16/526
USPC .......................................................... 16/228
See application file for complete search history.

(56) References Cited

U.S. PATENT DOCUMENTS

| 5,657,107 | A  | * | 8/1997 | Wagner ............. | G02C 5/2236 16/228 |
| 6,505,933 | B2 | * | 1/2003 | Schuchard ......... | G02C 5/2236 16/228 |
| 6,892,422 | B2 | * | 5/2005 | Schuchard ......... | G02C 5/2236 16/228 |

(Continued)

FOREIGN PATENT DOCUMENTS

| DE | 10 2014 223 150 A1 | 5/2015 |
| EP | 0615149 A1 | 9/1994 |

(Continued)

OTHER PUBLICATIONS

IT Search Report, dated Jun. 12, 2018, from corresponding IT 201700121879 application.

*Primary Examiner* — Jeffrey O'Brien
(74) *Attorney, Agent, or Firm* — Young & Thompson

(57) ABSTRACT

An elastic hinge for eyeglasses includes: a box-shaped housing with an inlet aperture; a fork carriage, slidably mounted in a guiding cavity inside the box-shaped housing opposing an elastic element; and an elastic holding clip, snap-engageable with a retaining structure of the housing cavity, against which one end of the elastic element abuts. The elastic holding clip is generally C-shaped, providing a resting arm and a flexible arm joined by a connecting portion, the flexible arm having an engaging unit to snap-engage with the retaining structure, the resting arm and flexible arm elastically biased one towards the other by inner walls of the housing. The flexible arm is integral with at least one bias element, accessible from an inlet aperture of the housing, defining bias planes to be engaged with a tool, introduced via the inlet, for imparting a disengaging bias, bending the flexing arm towards the resting arm.

10 Claims, 14 Drawing Sheets

(56) References Cited

U.S. PATENT DOCUMENTS

| | | | | |
|---|---|---|---|---|
| 7,350,271 | B2* | 4/2008 | Genelot | G02C 5/2236 16/228 |
| 7,572,005 | B2* | 8/2009 | Hotellier | G02C 5/2236 16/228 |
| 8,302,259 | B2* | 11/2012 | Wannenmacher | G02C 5/2245 16/228 |
| 8,562,288 | B2 | 10/2013 | Guemmer | |
| 8,978,204 | B2* | 3/2015 | Hotellier | G02C 5/008 16/228 |
| 10,302,971 | B2* | 5/2019 | Montalban | G02C 5/2218 |
| 2008/0266518 | A1* | 10/2008 | Niu | G02C 5/2236 351/153 |
| 2017/0139229 | A1* | 5/2017 | Montalban | E05D 3/022 |
| 2019/0271857 | A1* | 9/2019 | Montalban | G02C 5/2245 |

FOREIGN PATENT DOCUMENTS

| | | |
|---|---|---|
| EP | 632306 A1 | 1/1995 |
| EP | 1743207 A1 | 1/2007 |
| EP | 2009484 A1 | 12/2008 |
| EP | 2109795 B1 | 10/2009 |
| EP | 2275647 A2 | 1/2011 |
| EP | 2 553 519 A2 | 2/2013 |
| FR | 2741459 A1 | 5/1997 |
| IT | 0001420896 A | 11/2013 |
| JP | H11271691 A | 10/1999 |
| WO | 9739377 A1 | 10/1997 |
| WO | 0131386 A1 | 5/2001 |
| WO | 2005/121873 A1 | 12/2005 |
| WO | 2006/029776 A1 | 3/2006 |
| WO | 2011103949 A1 | 9/2011 |
| WO | 2011/121554 A2 | 10/2011 |

* cited by examiner

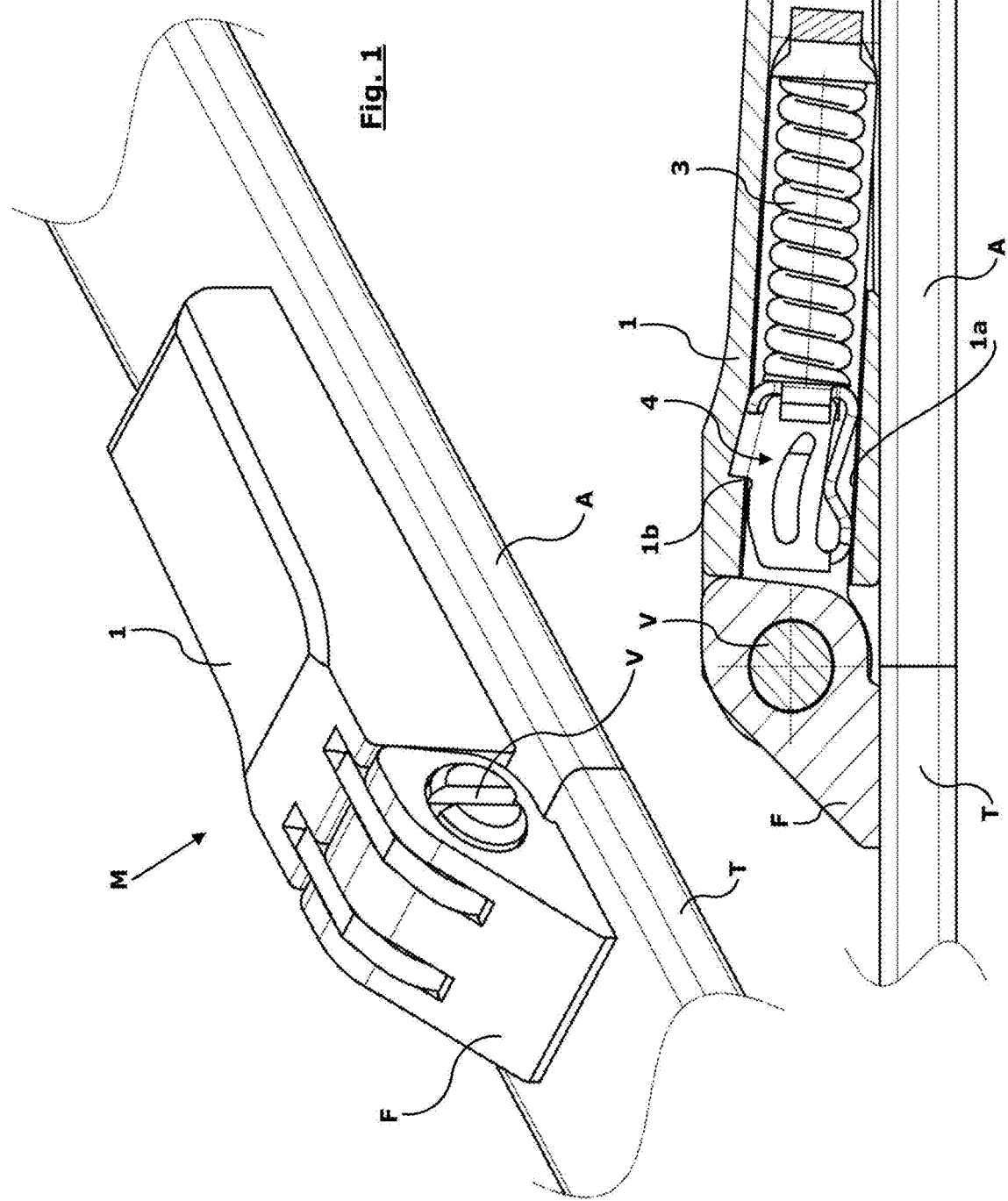

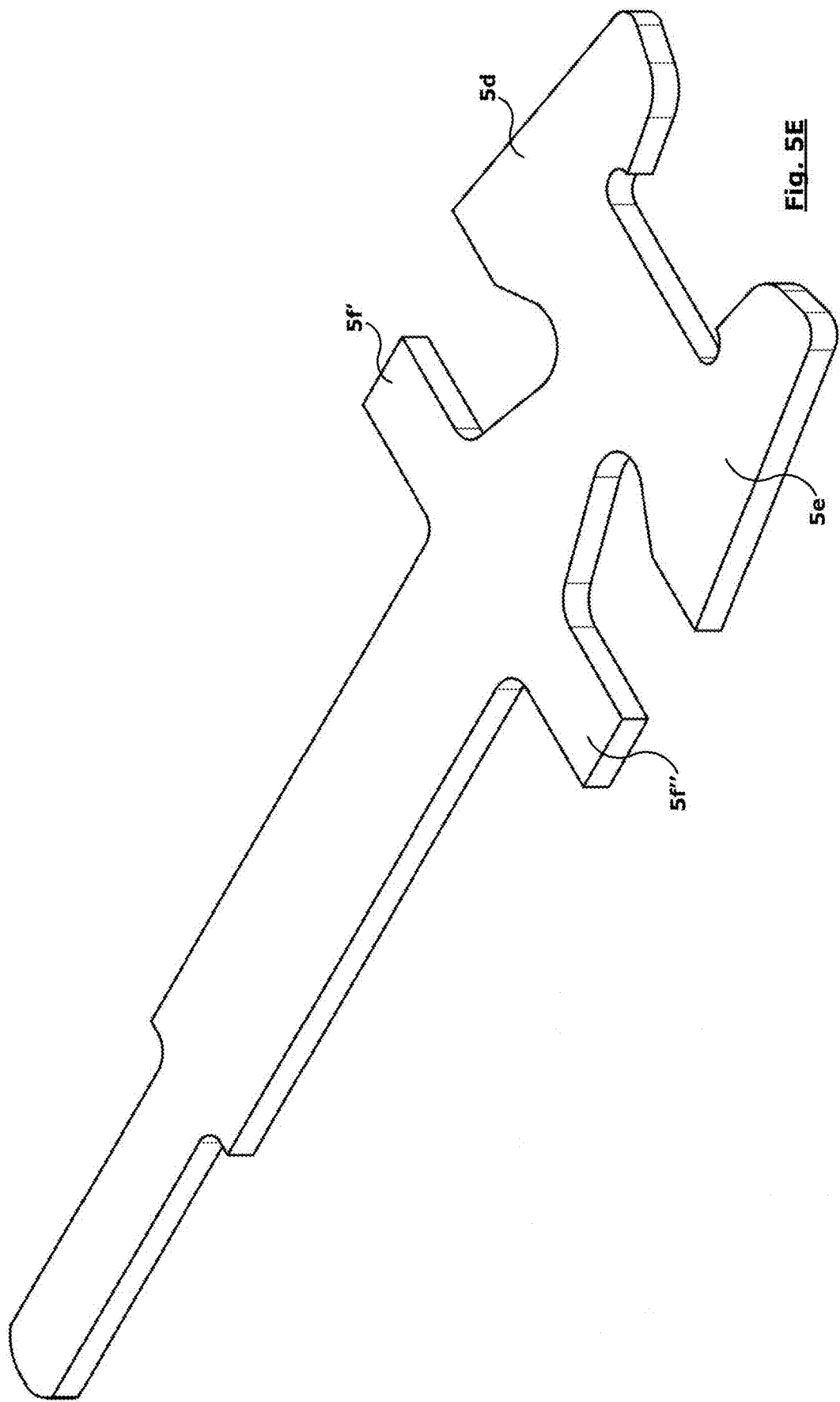

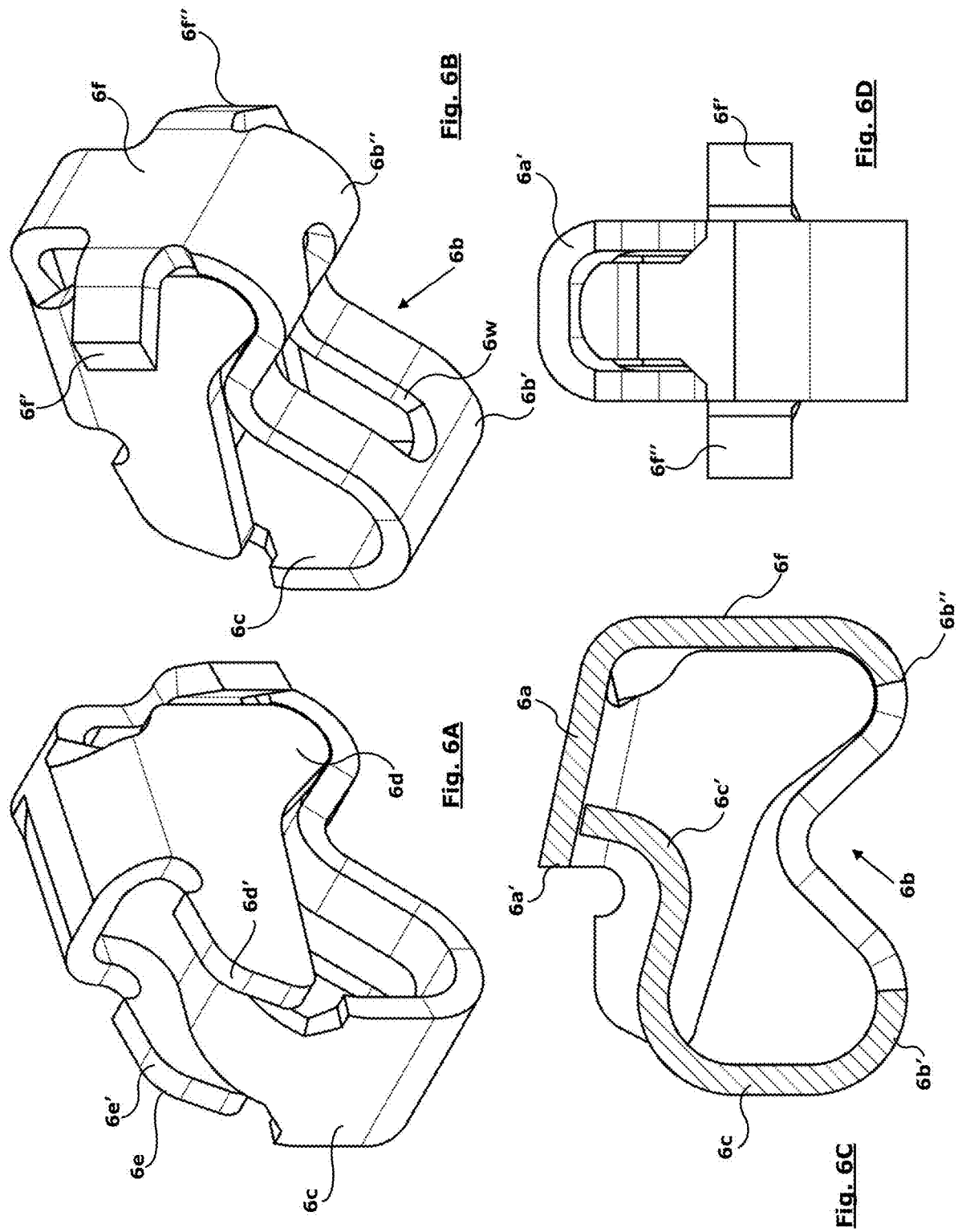

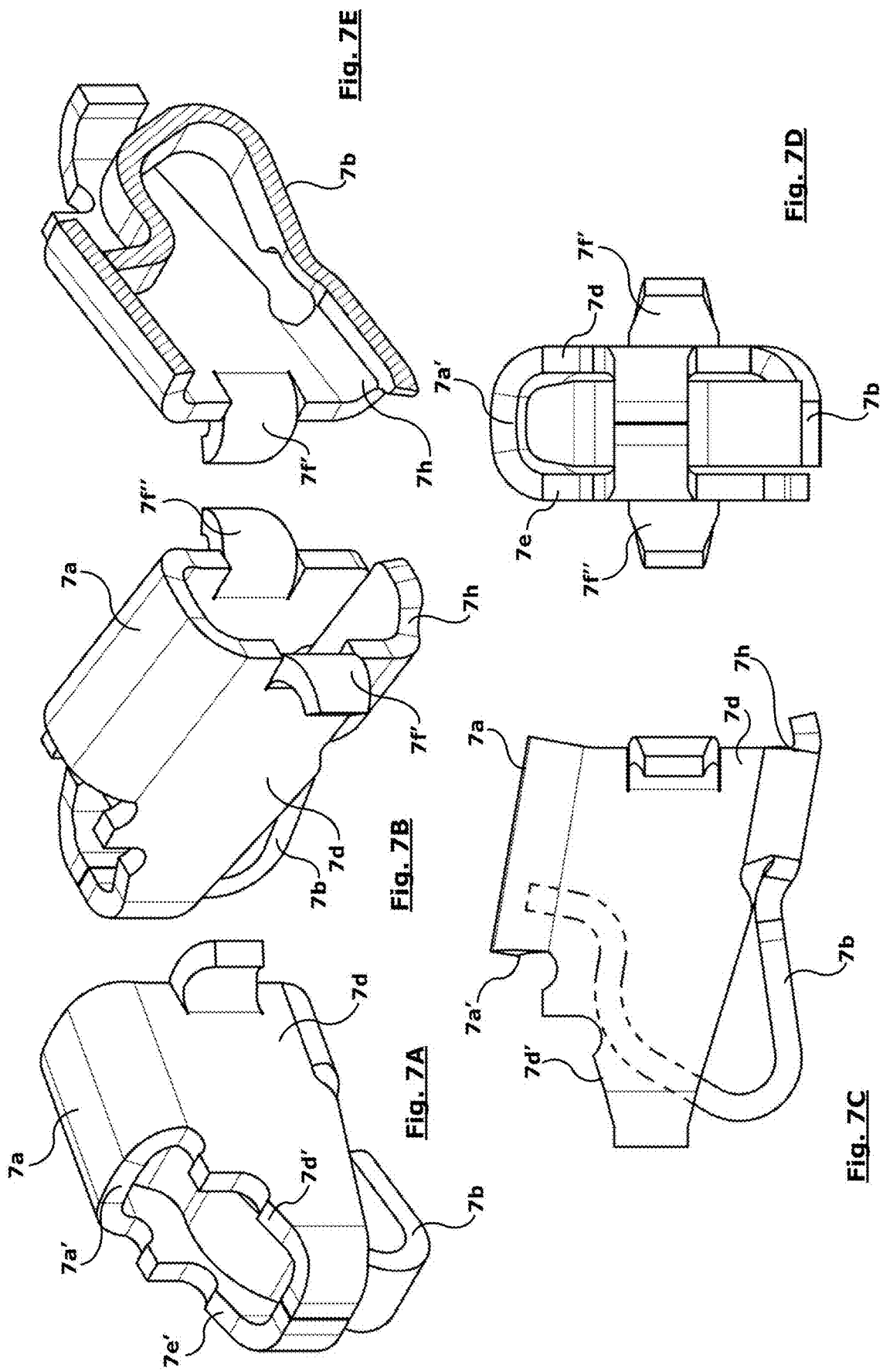

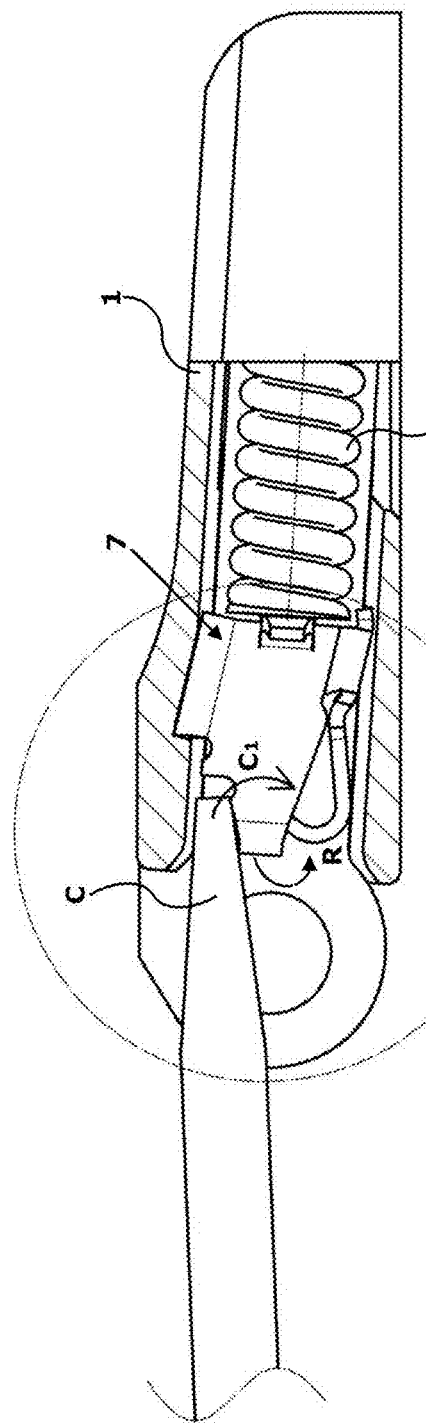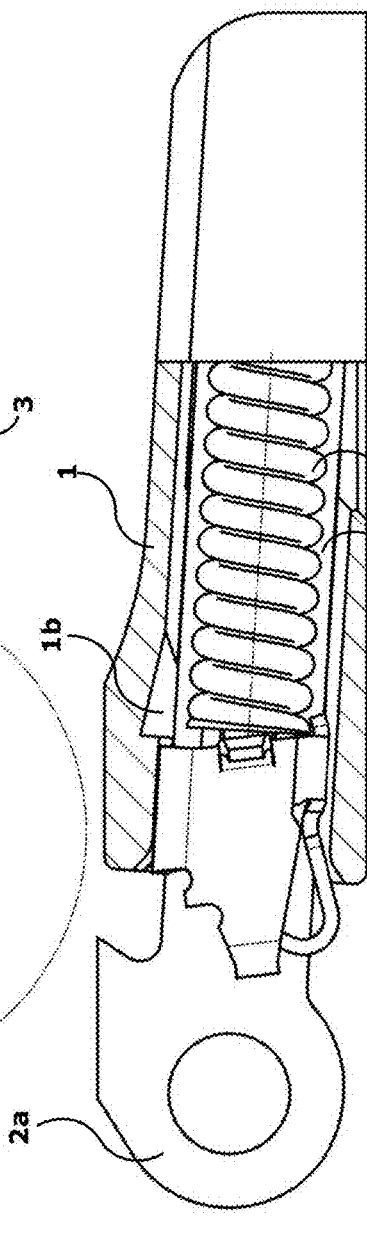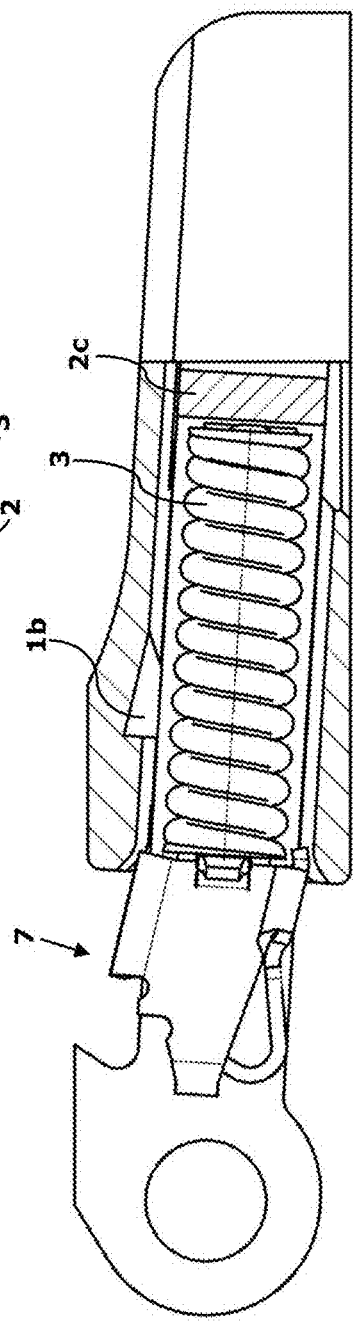

REMOVABLE ELASTIC HINGE FOR EYEGLASS FRAMES

FIELD OF THE INVENTION

The present invention relates to an elastic hinge for eyeglasses, in particular a removable elastic hinge provided with a fork-shaped carriage.

BACKGROUND ART

As is known, in the eyewear field, the so-called "flex" or elastic hinges are becoming widely used. These hinges in general are made of a female component, typically fixed to the front frame of the eyeglass, and a male component comprising a sliding guided carriage, in contrast to an elastic element, inside a housing placed on the temple of the eyeglass. The carriage element has one or more eyelets engaging with a hinge pin, which in turn is integral with the female component. An example of this hinge is disclosed in FR2741459.

For the operation of the hinge, the elastic contrast element of the sliding carriage, normally a coil spring, is constrained on one side to the bottom portion (the innermost one of the housing) of the carriage and, on the other, to abutting/stopping means which are integral in the longitudinal direction within the housing. These abutting means are configured in very different ways: generally, they are in the shape of screws or through pins, or in the shape of snap elastic components. The latter, also known as elastic holding clips, have the advantage of being able to be introduced into the housing, without providing holes or other visible changes to the outside of the housing, deforming elastically and then snapping in the desired working position in corresponding seats obtained inside the housing.

The elastic holding clips are highly appreciated, as they have a low aesthetic impact on the carriage housing (as opposed to screws or pins) and are very cheap and simple to manufacture. Snap elastic holding clips of the prior art, are disclosed in the same above-mentioned FR2741459, but also in EP1743207, EP2109795, WO2005/121873 being owned by the same Applicant and also WO2006/029776 and in some embodiments of WO2011/121554.

Also in the documents IT1420896 and EP2553519, it is proposed a very effective elastic hinge, provided with a fork carriage sliding in a rigid housing, wherein the holding clip of the carriage consists of a folded metal strip.

All these solutions have the advantage of being very simple to assemble but, by providing a snap engagement, they cannot be dismantled. In some cases—typically when a component breaks down—there is, however, the need to remove an elastic hinge, pulling the carriage out of its seat, so as to replace the malfunctioning components.

To meet this need, the known technique offers alternative solutions.

For example, this is obtained by using hinge versions wherein the carriage is constrained inside the housing by means of a screw, a pin or, more generally, a removable element. Examples of these solutions are disclosed in EP2009484, WO9739377, JPH11271691, EP0615149 and WO2011103949. As already seen above, the drawback of these solutions lies in the fact that the removable locking elements, such as screws or pins, are necessarily seen from the outside of the hinge, with consequent impact on the aesthetics of the hinge itself. Moreover, the locking element constitutes an additional component to be managed in the warehouse and to be handled in the assembly step, implying higher costs.

Alternative solutions, which do not have locking elements protruding from the outside, are known for example from WO0131386, EP632306 and EP2275647, wherein the end of the elastic element inside the housing is blocked by means of a tilting rigid body. The tilting body remains blocked in its seat inside the housing by means of an inclined bias produced by a coil spring. Thanks to the degree of freedom of the rigid tilting body, it is possible to intervene with a tool to rotate the rigid body backwards and hence freeing it from the engagement in its seat.

This solution is not completely secure, because the rigid body does not block naturally in its seat, but requires the collaboration and a correct alignment of the coil spring: if this cooperation of forces is not well calibrated, it is not possible to obtain a good assembly, or the disassembly is hardly achievable. Furthermore, the rigid body is not constrained to the carriage, therefore it requires specific production precautions to be handles by the eyeglass manufacturer.

SUMMARY OF THE INVENTION

The object of the invention is therefore to propose an elastic hinge provided with an elastic holding clip, which operates effectively with snap engagement, overcoming at the same time the above-disclosed drawbacks, i.e. it can be disassembled.

This object is achieved by a hinge having the features indicated in the attached main claim. Other inventive aspects of the invention are described in the dependent claims.

BRIEF DESCRIPTION OF THE DRAWINGS

However, further characteristics and advantages of the clip according to the invention will be more apparent from the following detailed description of some preferred embodiments, given by way of example and illustrated on the accompanying drawings, wherein:

FIG. 1 is an interrupted perspective view of a flexible hinge with fork carriage being mounted on a temple and front end piece of an eyeglass frame;

FIG. 3 is a longitudinal sectional view of the hinge of FIG. 1;

FIG. 5E is a perspective view of a shaped metal sheet from which the holding clip of FIG. 5A is obtained;

FIGS. 6A-6D are similar views to FIGS. 5A-5D of a third embodiment of the invention;

FIGS. 7A-7D are similar views to FIGS. 5A-5D of a fourth embodiment of the invention;

FIG. 7E is a perspective view of the holding clip, longitudinally sectioned, according to the fourth embodiment;

FIGS. 8A-8C are partial sectional views of a hinge according to the invention which illustrate a disassembly sequence;

DETAILED DESCRIPTION OF CURRENT PREFERRED EMBODIMENTS

Figure 2A:
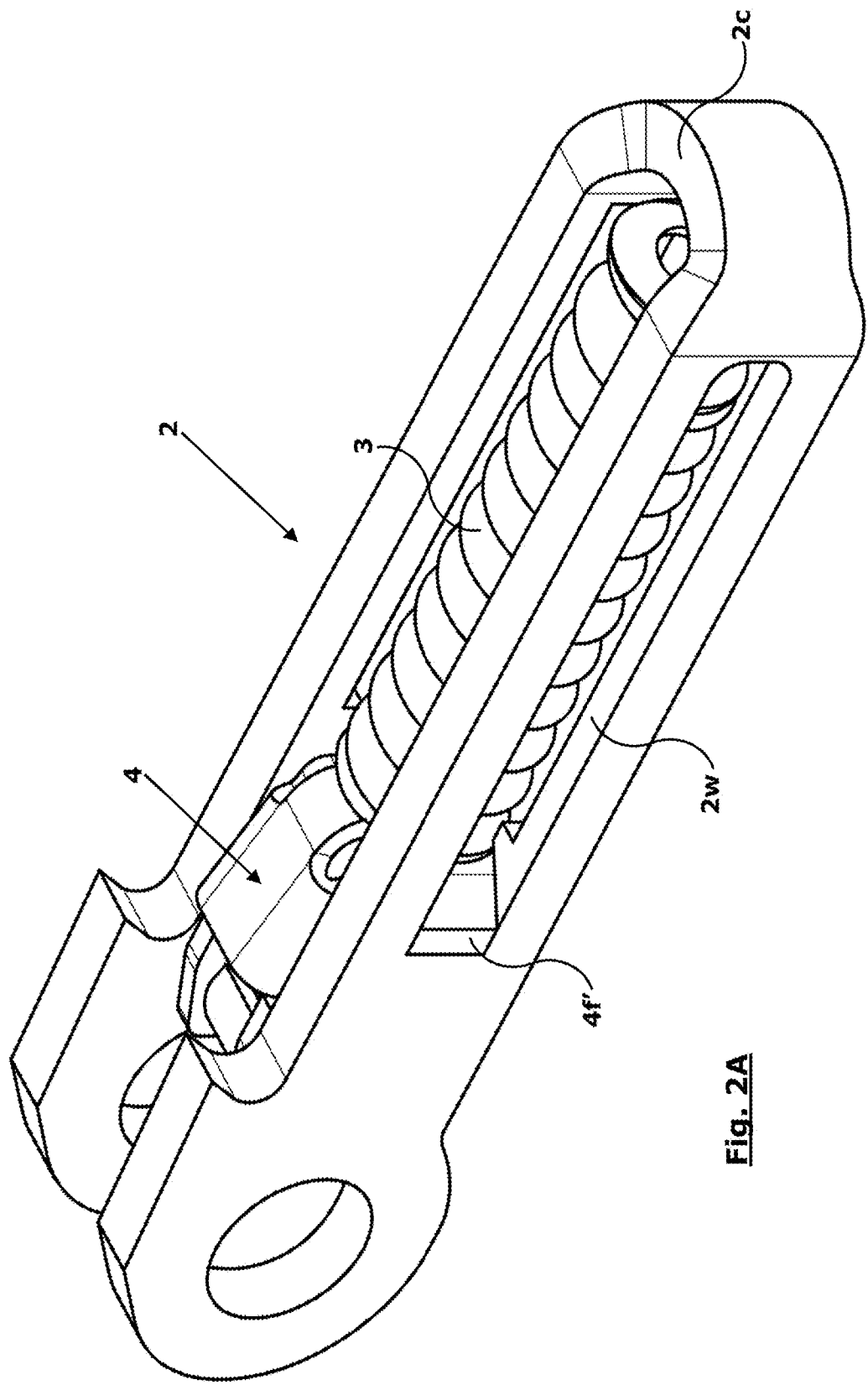
FIG. 2A is a perspective view of a carriage, comprising an elastic element and a holding clip according to a preferred variant of the invention.
Figure 2B:
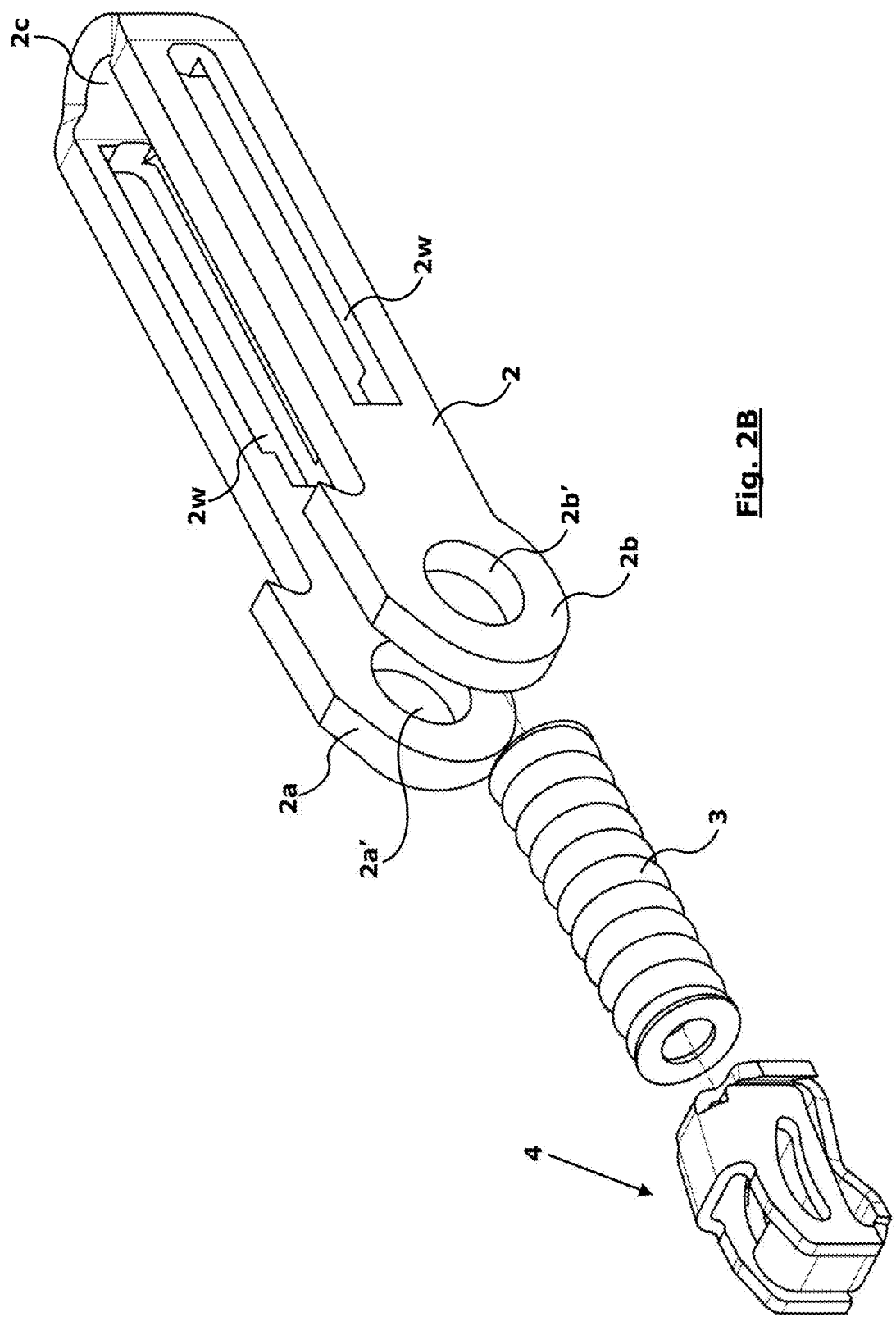
FIG. 2B is an exploded view of the carriage of FIG. 2A.
Figure 4A:
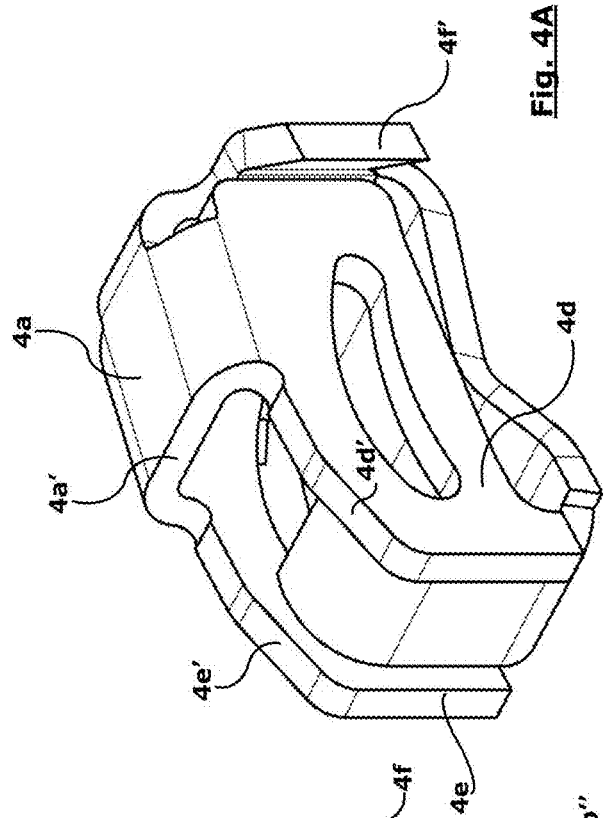
FIGS. 4A and 4B are perspective views, from different points of view, of an elastic holding clip according to a first embodiment of the invention.
Figure 4B:
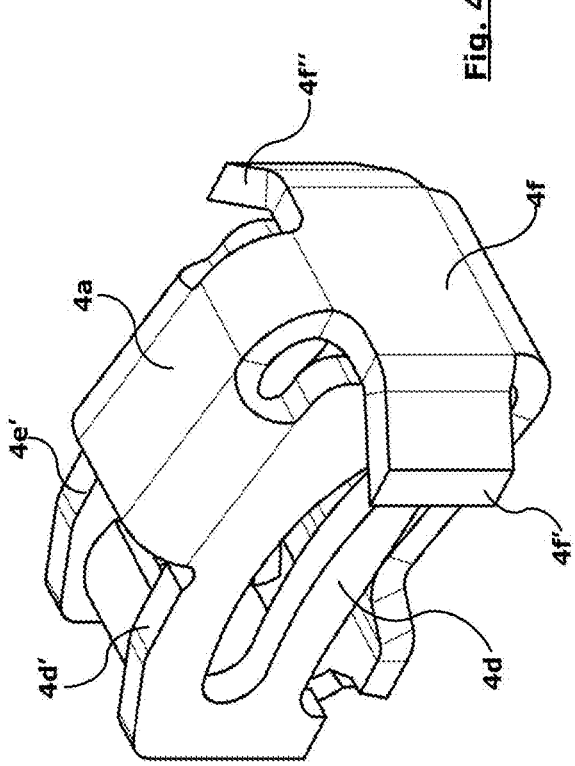
Figure 4D:
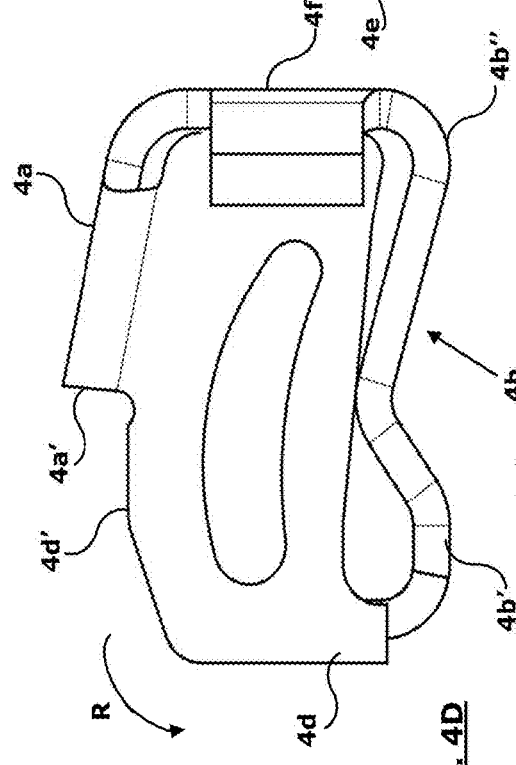
FIG. 4D is an elevational side view of the holding clip of FIG. 4A.
Figure 4C:
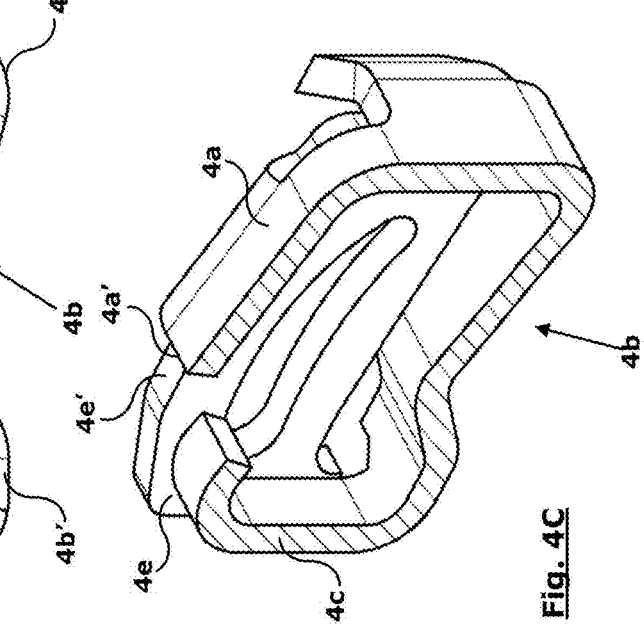
FIG. 4C is a view of the holding clip, longitudinally sectioned, of FIG. 4B.

FIGS. 1-3 shows a flexible hinge for eyeglasses of the type having a fork carriage. In the context of the present application, the term "fork carriage" aims to designate any carriage terminating in the front part with at least one pair of separate and parallel hinging eyelets: the two eyelets are then integral with corresponding prongs of a thin U-folded carriage body, or they can converge towards a common carriage body obtained with other techniques but provided with a suitable central housing for an elastic element.

In FIG. 1 the whole hinge is well represented in its final arrangement: it is comprised of a female component F of the hinge—having the shape of a fork with a through hole, integral with a front end piece T of a frame of a pair of eyeglasses—joined in rotation, by means of a pivoting pin V, with a relative male M component of the hinge integral with a temple A of the frame.

The male component of the hinge comprises a box housing 1 and a carriage, indicated with 2 as a whole, intended to slide within a guide seat formed in the housing 1, as better disclosed below. The housing 1 has an inlet mouth through which the carriage 2 enters and exits in longitudinal direction.

According to the technique disclosed in IT 1414611, the carriage 2 presents, for example, a general arrangement like a fork with two prongs—preferably obtained from a cut and U-shaped metal sheet—at the free ends of the two prongs being formed two eyelets 2a and 2b, wherein two aligned holes 2a' and 2b' are made, whose centers determine the axis of rotation of the hinge.

Between the two parallel prongs of the U-shaped carriage, an elastic element 3 is installed, for example a coil spring, constrained, on one hand, resting on a bottom portion 2c of the U-shaped carriage (in the area where the carriage body forms an end curved section) and, on the other hand, to a holding clip 4 which is made integral with the guiding seat of the housing 1 of the carriage 2.

In a manner known per se, the holding clip 4 has a shape which yields elastically, by collapsing, when inserted in the seat of the housing 1; once inserted into the seat, the holding clip 4 deploys elastically and causes an engagement portion thereof to abut against the wall of the seat of the housing 1, preventing it from being extracted in the opposite direction.

For this purpose, it is typically constituted by at least a flexible arm provided with an engagement portion and an opposite resting arm, which abuts on an inner wall 1a of the housing, for elastically loading the holding clip itself. In fact, in the natural state of the holding clip, the flexible arm, on which the engagement portion is carried, has a certain divergence with respect to the resting arm, divergence which is compressed when the holding clip 4 is inserted and forced into the cavity of the housing 1. Because of this mounting compression, the elastic holding clip 4 is loaded elastically, with the flexible arm being then stressed away from the resting arm: this mechanism ensures that the engagement portion is snapped up, and held therein forcibly, inside a holding seat 1b opposed to the abutment wall 1a.

Normally, as shown in the accompanying figures, the abutment wall 1a is constituted by the bottom wall of the guiding cavity of the box-shaped housing 1 and the holding structure 1b has a shape of a recess or a step provided in the opposite vault wall of the same cavity.

The engagement portion of the holding clip 4 is in the form of a tab or tooth provided with an abutment edge, facing the exit direction of the carriage 2 from the housing 1: the engagement portion engages with the holding structure 1b and keeps the holding clip 4 locked in position; in this way, the holding clip 4 holds the elastic element 3, preventing the carriage 2 from being completely removed from the housing 1.

For its operation, the elastic holding clip 4 has typically a generic C-shaped configuration, with an upper arm and a lower arm joined together by a connecting portion. The upper arm constitutes the flexible arm carrying the engagement portion, while the lower arm constitutes the resting arm. The ends of the two upper and lower arms are directed towards the inlet of the housing 1, so that the holding clip can close (bringing the upper and lower arms close each other) when it is inserted into the housing 1. The compression of the C-shaped configuration, obtained by inserting the holding clip 4 inside the housing 1, produces the elastic expansion reaction which holds the engagement portion into the holding structure 1b. In other words, by means of the connecting element between the flexible arm and the resting arm the elastic reaction is transferred, which is pushing the two arms apart from one another.

According to the invention, the elastic holding clip 4 has also at least a bias portion, rigidly integral with the flexible arm, on which it is possible to intervene from the entry inlet of the housing 1, in order to exert an action opposite to the elastic stress which pushes the engagement portion in the holding structure 1b.

Typically, the bias portion is determined by at least one plane land, transverse to the bending plane of the flexible arm of the holding clip 4 and arranged in the front part of the holding clip, in an area falling near the inlet of the housing 1.

In this context, with "front part or end" it is meant the inlet side of the housing 1. Up and down, right and left, refer to the orientation of the attached figures, even if they are not intended as absolute terms because an elastic hinge can take any orientation in space, once it is mounted on the frame of a pair of eyeglasses.

FIGS. 4A-4D illustrate a first embodiment of the holding clip according to the invention. The holding clip is obtained from a strip of a sheet (of elastic material, typically metal) cut and folded so as to define a generic C shape. An upper branch constitutes a flexible arm 4a, provided with an end edge 4a' forming the engagement portion. A lower branch constitutes a resting arm 4b and preferably has two resting areas 4b' and 4b", spaced longitudinally, between which it is provided a fold which enhances the flexibility of the holding clip. At its front end, the resting arm 4b projects with an end tab 4c which rises perpendicularly to close the front part of the holding clip 4.

According to the teaching of the invention, from the flexible arm 4a, two side ears 4d and 4e extend towards the bottom, which extend forward with two upper edges 4d' and 4e' which lie at a lower level with respect to the end edge 4a' of the flexible arm. The upper edges 4d' and 4e' define a bias plane, transversal to the bending plane of the arm 4a (which coincides with the plane of the proper sheet of FIG. 4D), on which a tool can act (for example, the flat tip of a screwdriver). As can be seen in the figures, the edges 4d' and 4e' are at a lower level of the end edge 4a', so that the bias plane is visible from the inlet mouth of the housing 1 and therefore can be reached by a tool inserted through the inlet of the housing 1.

The action of the tool on the bias plane makes it possible to apply a moment R (FIG. 4D) which, through the side ears, cause bending of the flexible arm 4a towards the resting arm 4b, collapsing the holding clip and then disengaging the engagement portion 4a' from the holding structure 1b of the housing.

Preferably, from the rear side 4f of the holding clip two opposite side tabs 4f' and 4f" depart, said tabs having suitable widths and heights to be inserted in lateral cut-outs 2w formed on the two fork sides of the carriage 2.

FIGS. 5A-5E illustrate a second embodiment of the holding clip according to the invention. Elements corresponding to those of FIGS. 4A-4D have the same references, except that in this case they have base 5.

Figure 5A:
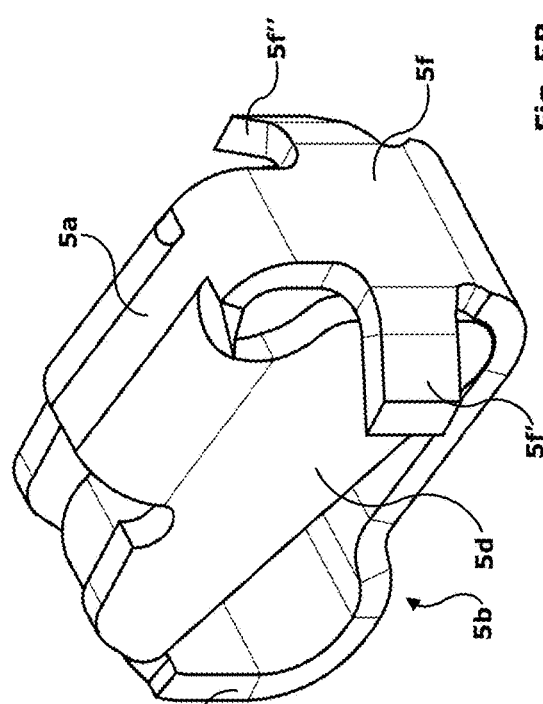
FIGS. 5A and 5B are perspective views, from different points of view, of an elastic holding clip according to a second embodiment of the invention.
Figure 5C:
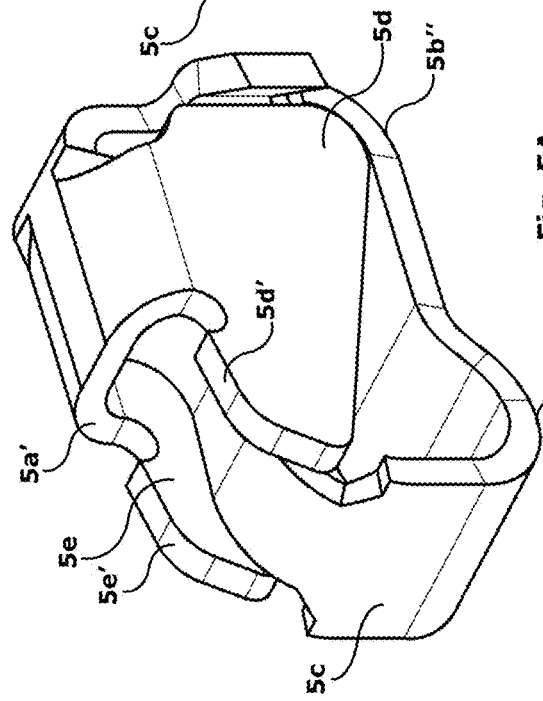
FIG. 5C is an elevational side view of the holding clip of FIG. 5A.
Figure 5B:
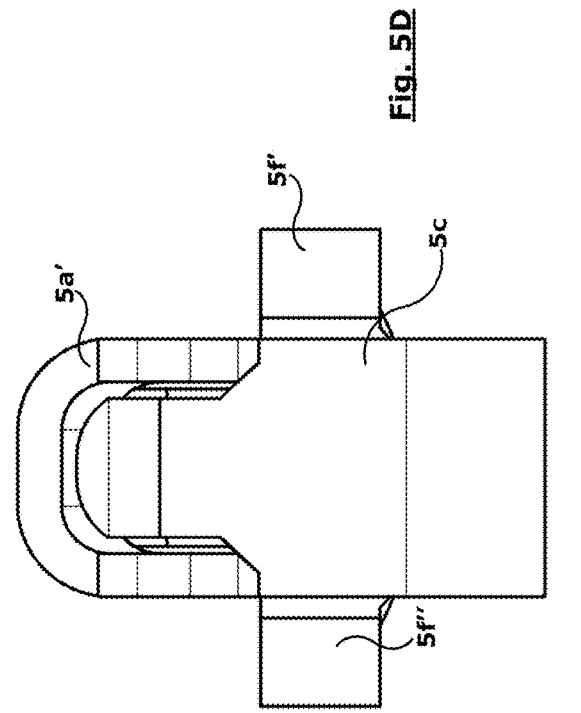
Figure 5D:
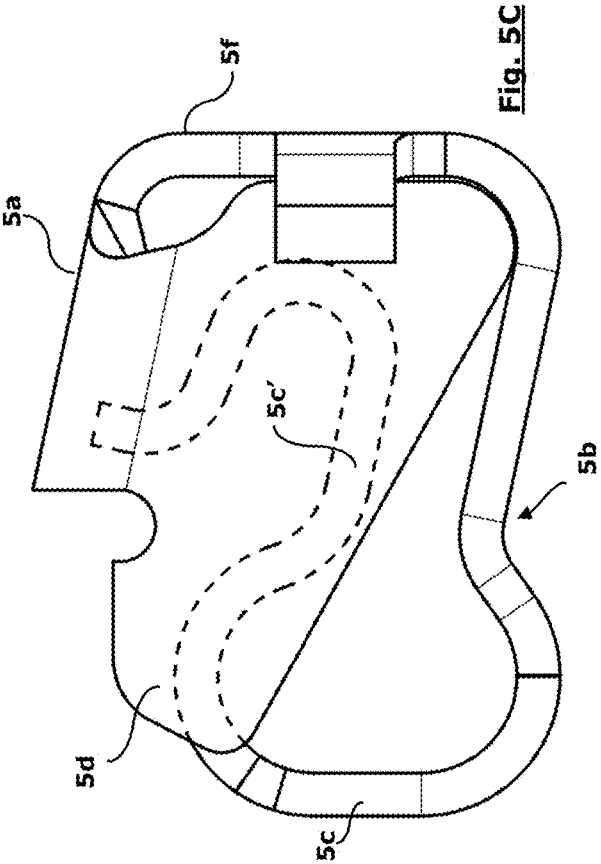
FIG. 5D is an elevational front view of the holding clip of FIG. 5A.
Figure 9A:
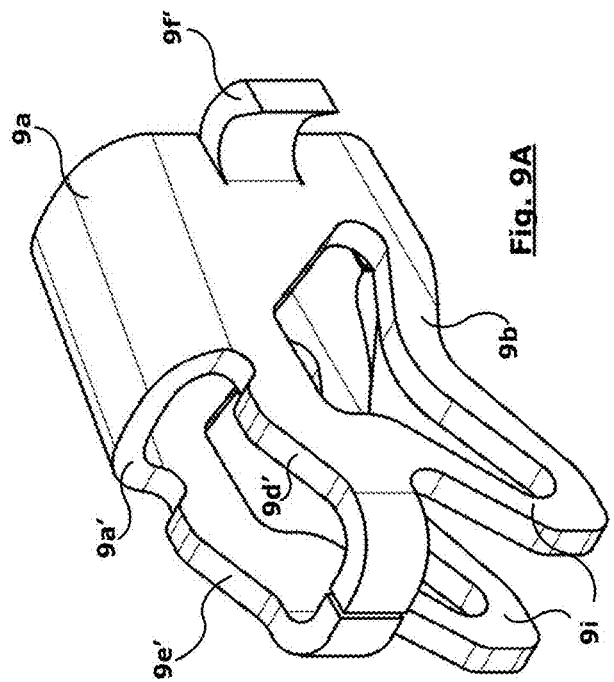
FIGS. 9A and 9B are similar views to FIGS. 5A-5B of a fifth embodiment of the invention.
Figure 9B:
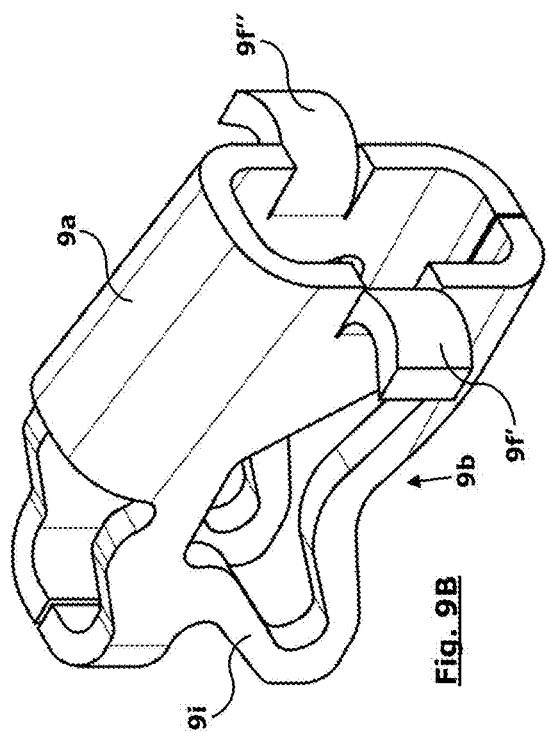
Figure 9C:
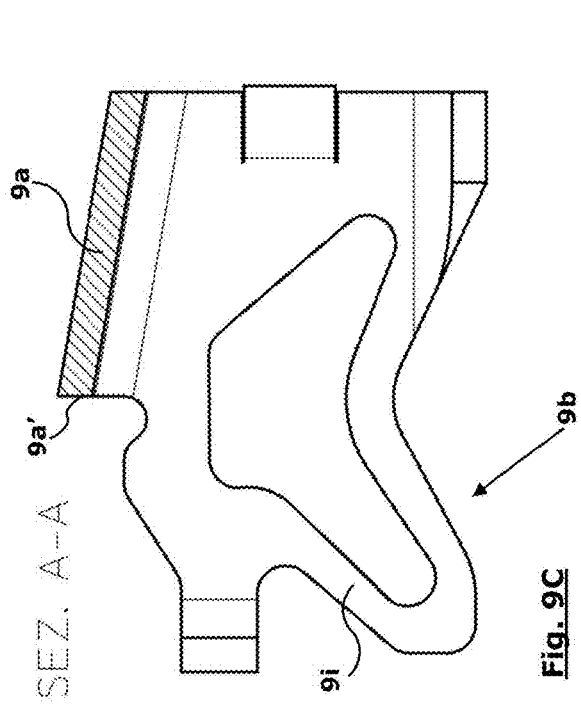
FIG. 9C is a longitudinal sectional view of the holding clip of FIG. 9A.
Figure 9D:
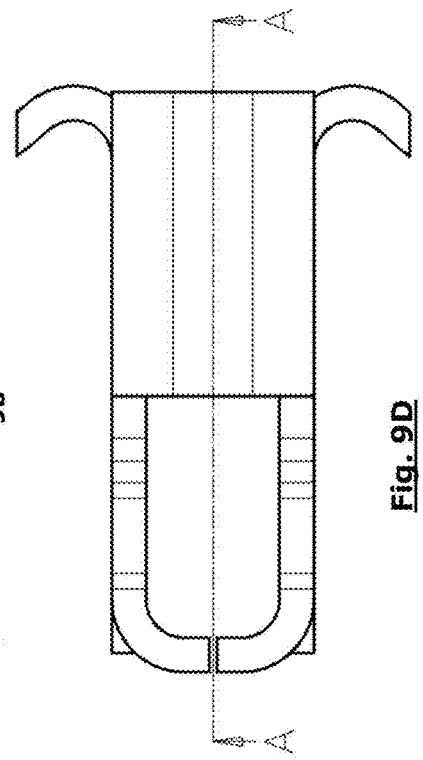
FIG. 9D is a top plan view of the holding clip of FIG. 9A.

In this case, the lower resting arm 5b has an extension tab 5c which extends with a further curved portion 5c' which terminates in contact below the flexible arm 5a (as can be clearly seen in FIG. 5C). Through appropriate sizing and folding of the various components, starting from a shape of metal sheet like that shown in FIG. 5E, it is possible to arrange the end of the curved portion 5c' so that it elastically pushes against the flexible arm 5a, i.e. it tends to oppose coming closer of the resting arm 5b. With this arrangement a further elastic bias is obtained, which is useful for making effective the snap engagement of the engagement portion 5a' in the holding structure 1b of the housing 1.

For the remaining part, this embodiment has elements which correspond to those of the first embodiment.

FIGS. 6A-6D illustrate a third embodiment of the holding clip according to the invention. Elements corresponding to those of FIGS. 4A-4D have the same references, except that in this case they have base 6.

In this case, the resting arm 6b has a very pronounced curve (as can be seen in FIG. 6C) and a longitudinal cut-out 6w, which has the purpose of lightening the resting arm and increasing its flexibility and ability to bear the fold.

For the remaining part, even this embodiment has elements which correspond to those of the first embodiment.

FIGS. 7A-7E illustrate a fourth embodiment of the holding clip according to the invention. Elements corresponding to those of FIGS. 4A-4D have the same references, except that in this case they have base 7.

In this case, the holding clip is obtained by folding a metal sheet mainly around a longitudinal axis of the holding clip, rather than around a transverse axis as in the previous embodiments. Also in this case, a flexible arm 7a provided with an engagement portion 7a', is provided with two side ears 7e and 7d which descend parallel and join each other on the front side. The side ears 7e and 7d have upper edges 7e' and 7d' which define a bias plane. However, this embodiment provides that the lower resting arm 7b projects from one of the two side ears 7d, by means of a short connecting portion 7h. The bending stress of the holding clip, between the flexible arm 7a and the resting arm 7b, is thus transferred through the side ear 7d and the connecting portion 7h (instead of through the rear side, as in the previous embodiments).

For the remaining part, even this embodiment has elements which correspond to those of the first embodiment.

FIGS. 8A-8C illustrate an extraction sequence of a carriage from the housing 1, which shows the operation of a holding clip according to the fourth embodiment of the invention (being understood that, for the other embodiments, the operation is similar).

When the hinge is mounted, the carriage 2 is completely inserted into the housing 1 and the elastic holding clip 7 is elastically expanded, bringing the engagement portion into the recess 1b of the housing 1, thus determining its locking in position. One end of the spring 3 abuts against the holding clip 7, while the other end is engaging with the bottom portion 2c of the carriage 2.

Due to the arrangement of the holding clip according to the invention, it is possible to insert the flat tip of a screwdriver C (FIG. 8A) through the inlet of the housing 1 and rest it on the bias plane of the holding clip. Levering the vault of the housing, the tip of the screwdriver C can be rotated in direction C1 so as to rotate the front end of the holding clip with a moment according to the arrow R. In this way, the flexible arm is brought to come closer to the resting arm, overcoming the elastic reaction, so as to release the engagement portion from the holding structure 1b of the housing. Once the engagement portion is completely out of the holding structure 1b, it is possible to withdraw the carriage from the housing through the inlet (direction E in FIG. 8B).

According to the preferred embodiment, the elastic holding clip remains then engaged on the carriage 2 by means of the opposed side tabs, which are guided into the cut-outs 2w and held therein by the action of the elastic element 3.

The preassembled unit consisting of carriage 2, holding clip and elastic element 3 can be completely withdrawn from the housing 1 without any component becoming detached and lost.

FIGS. 9A-9D illustrate a fifth embodiment of the holding clip according to the invention. Elements corresponding to those of FIGS. 4A-4D have the same references, except that in this case they have base 9.

This embodiment is manufactured essentially with the same technique as the fourth embodiment, but in this case the holding clip body is completely symmetrical with respect to a longitudinal plane. The resting arm 9b is split into two thin elements which are joined, by means of bending elements 9i, with side portions 9e and 9d provided with upper edges 9e' and 9d' defining the bias plane. The bending elements 9i constitute elastic connections between the lower resting arms 9b and the upper flexible arm 9a. The bending elements 9i constitute elastic reaction elements of the holding clip, through which it is exerted and performed an elastic reaction force which opposes to the coming closer of the flexible arm to the resting arm.

For the remaining part, even this embodiment has elements which correspond to those of the first embodiment.

FIGS. 10A-10E illustrate a sixth embodiment of the holding clip according to the invention. Elements corresponding to those of FIGS. 4A-4D have the same references, except that in this case they have base 10.

Figure 10A:
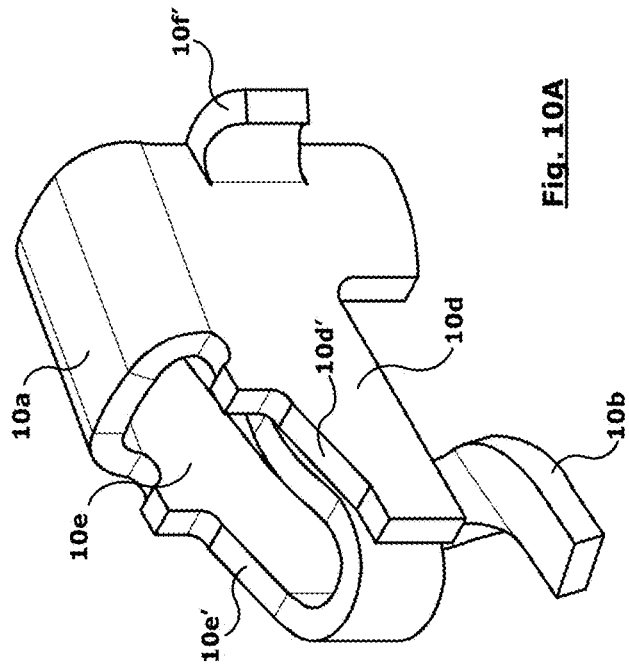
FIGS. 10A-10D are similar views to FIGS. 9A-9D of a sixth embodiment of the invention.
Figure 10B:
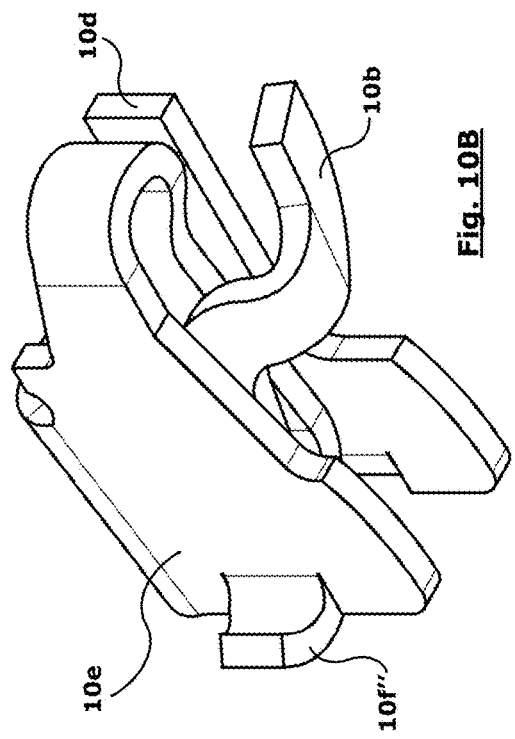
Figure 10C:
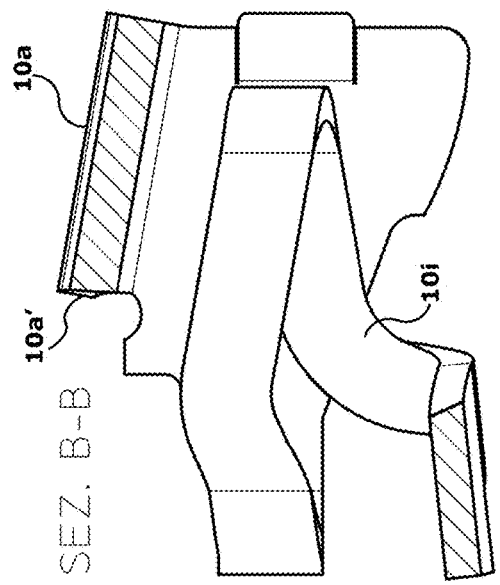
Figure 10D:
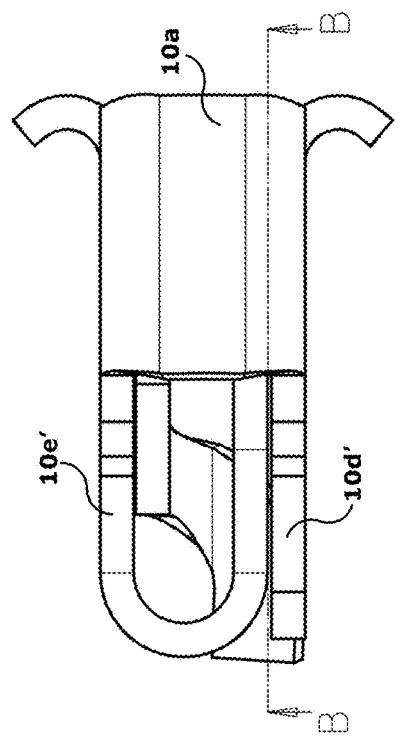
Figure 10E:
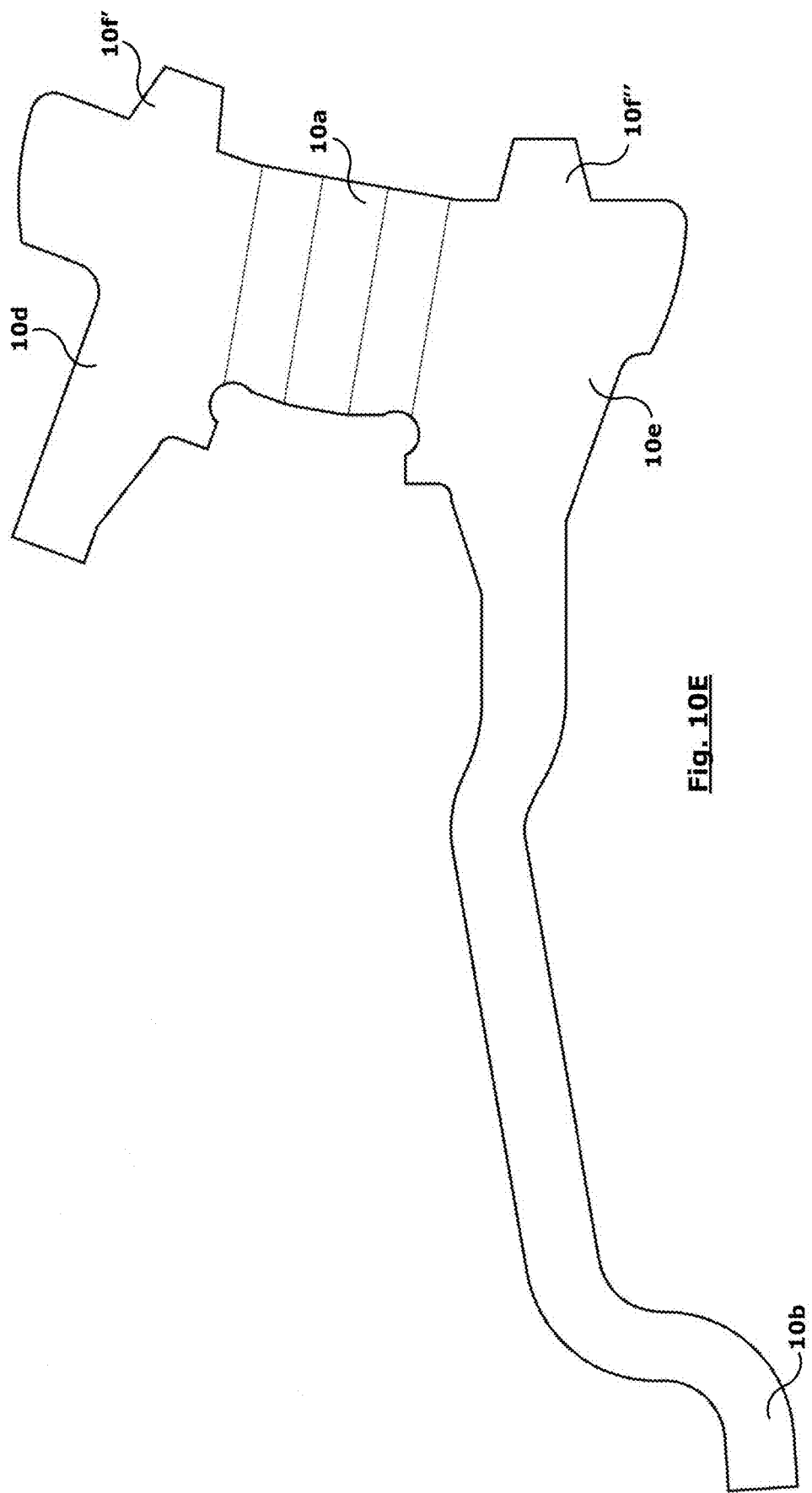
FIG. 10E is a plan view of a shaped metal sheet from which the holding clip of FIG. 10A is obtained.
Figure 11A:
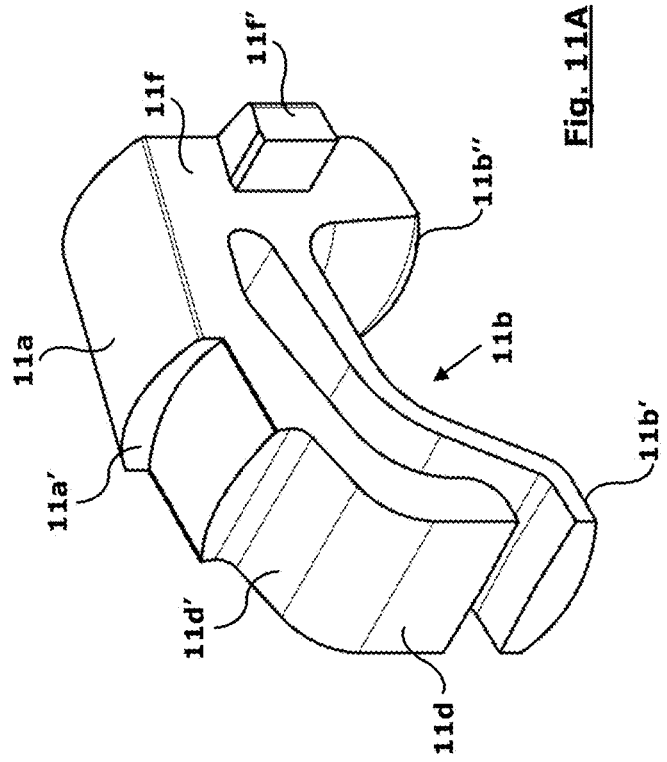
FIGS. 11A-11D are similar views to FIGS. 9A-9D of a seventh embodiment of the invention.
Figure 11B:
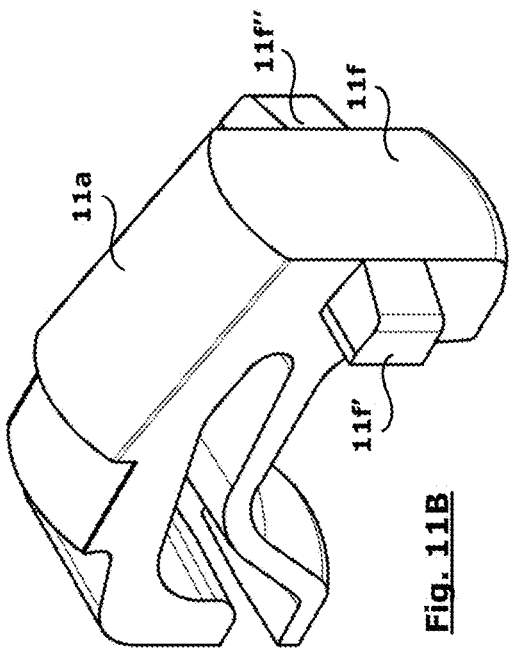
Figure 11C:
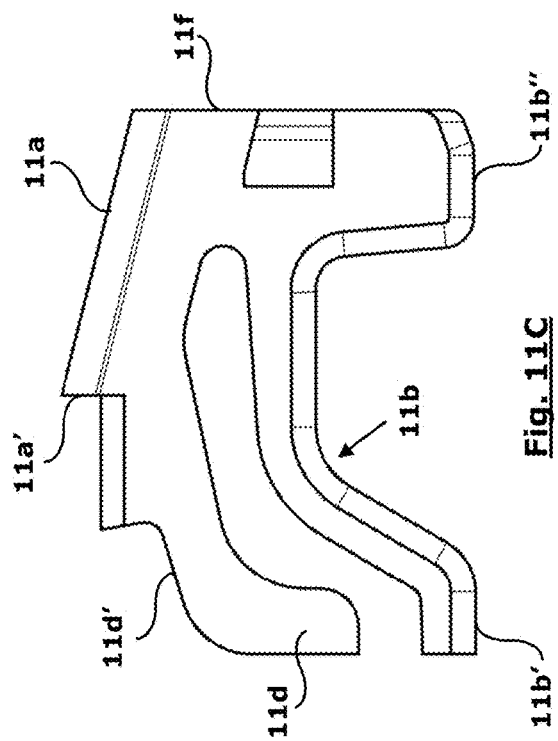
Figure 11D:
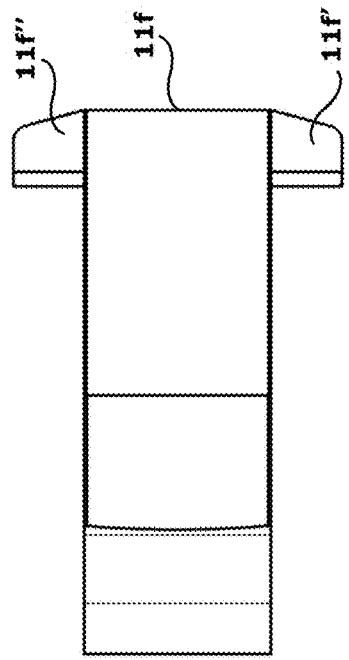

In this embodiment, the resting arm 10b is elastically connected to the flexible arm 10a by means of a bending element 10i which projects from the front part of a side ear 10e. The bending element 10i has at least a pair of folds which amplify the elastic flexibility of that part of the plate, so as to ensure an elastic stress which is sufficient to push the flexible arm 10a in an opposite direction to the resting arm 10b. FIG. 10E shows the shape of a cut metal sheet, before bending.

For the remaining part, even this embodiment has elements which correspond to those of the first embodiment.

FIGS. 11A-11D illustrate a seventh embodiment of the holding clip according to the invention. Elements corresponding to those of FIGS. 4A-4D have the same references, except that in this case they have base 11.

In this and in the following embodiments, the holding clip is no longer obtained from a folded metal sheet, but from a suitably machined solid body—possibly made from a profiled body—or by means of other technologies such as metal injection molding (MIM) from metal powders or micro-injection.

A resting arm lib projects from a rear base portion 11f and defines two resting points 11b' and 11b". A flexible arm 11a projects from the upper part of the rear base portion 11f and has an engagement portion shaped as a step 11a'. In this variant, from the flexible arm 11aa single protrusion 11d projects in the front direction, defining a stress plane 11d'.

With this typical C-shaped configuration, the elastic reaction element—as for the first embodiments—is represented by the connecting portion between the two arms, i.e. the rear base portion 11f.

Figure 13:
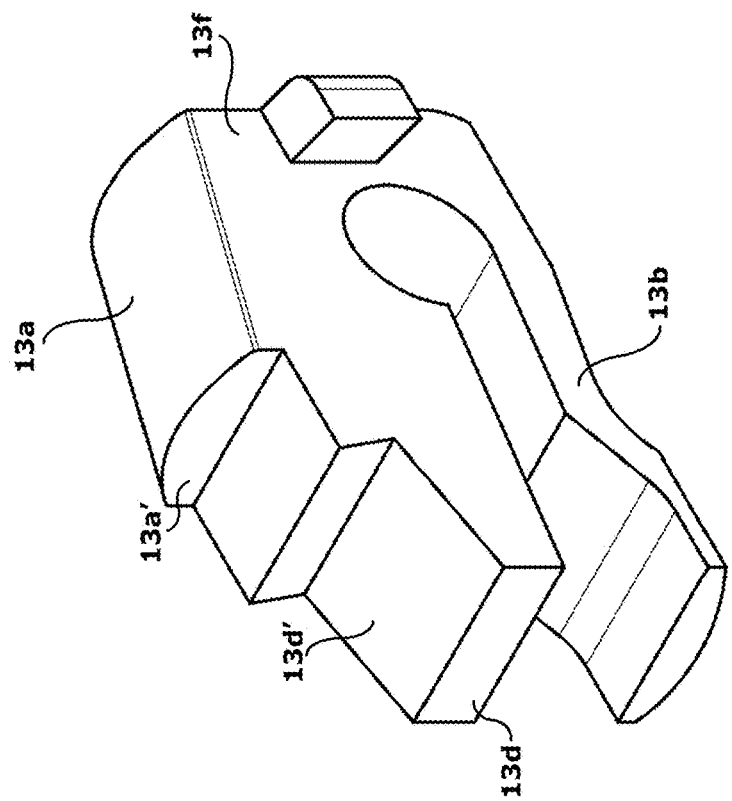
FIG. 13 is a perspective view of a holding clip according to a ninth embodiment of the invention.
Figure 12:
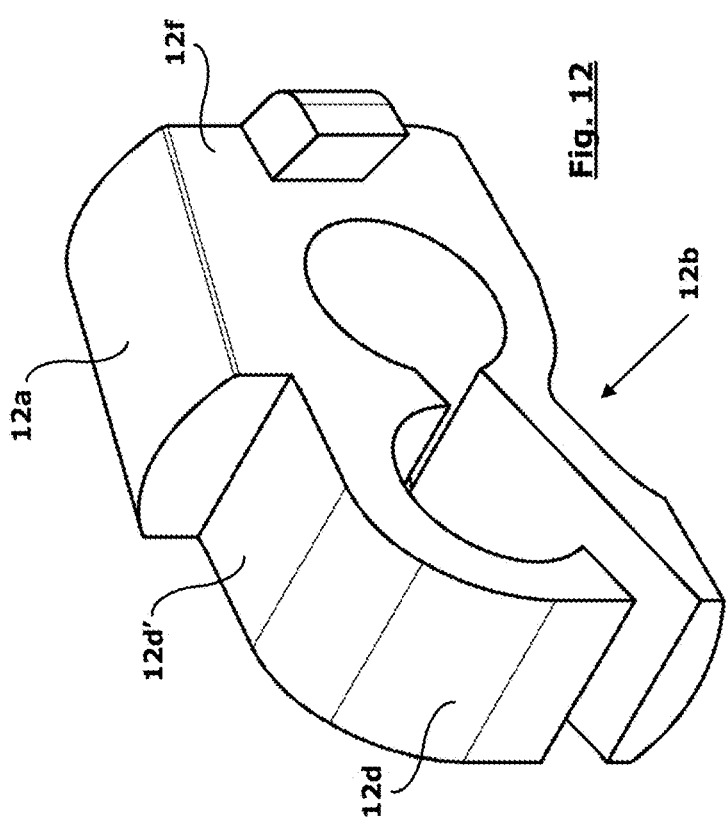
FIG. 12 is a perspective view of a holding clip according to an eighth embodiment of the invention.

FIGS. 12 and 13 show similar variants of a solid body holding clip, wherein various machining processes are applied to suitably exploit the generic C-shaped configuration and to obtain the desired elastic effect, an effective intervention ability for the tool and cost-effective manufacture.

As it is understood from the above detailed description, the solution of the invention allows to fully achieve the desired results.

The holding clip according to the invention, in fact, can be manufactured simply and in a cost-effective manner by means of various technologies, depending on the advantage or specific geometry chosen: either starting from a cut and then folded metal strip, or from a solid profile, or by means of the MIM or micro-fusion technology. Its shape allows to define a reduced transversal size, so as to obtain a hinge for eyeglasses having a reduced width.

The C-shaped structural arrangement offers significant elasticity to achieve the desired snap-lock function in the seat of the housing. The C-shaped arrangement does not necessarily require that all the components of the holding clip must be aligned on the same plane or that there is an axial symmetry, but it implies the presence of two opposite branches (flexible arm and resting arm), connected to each other by means of a connecting element through which efforts are transferred from one branch to the other.

At the same time, the inverse bending capacity, supplied by the presence of a bias plane integral with the flexible arm, allows to cause partial collapsing of the holding clip acting through the inlet of the box-shaped housing, so as to disengage the holding clip and to withdraw the carriage.

The operation of the holding clip and the possibility of extraction of the carriage are obtained regardless of the intervention and therefore the state (which could also be faulty) of the coil spring 3.

The additional presence of the side tabs, suitable to establish a mutual engagement between the holding clip and the carriage, allows to exploit the holding clip also to assemble a stable product (preassembled unit formed by carriage+spring+holding clip) which can be easily handled both during assembly and during the withdrawal step of the carriage, for the benefit of operators who have to intervene even without having specific equipment.

It is however understood that the invention is not limited to the particular embodiments illustrated above, which represent only non-limiting examples of its scope, but that numerous variants are possible, all within the reach of a skilled in the art, without thereby departing from the scope of the invention.

For example, although in the figures the bias plane is always defined by flat surfaces, it is understood that it could be represented by the rim edge of a hole. For example, a longitudinal hole in a portion of the flexible arm, which can be reached from the inlet mouth, allows to insert a pointed tool and to exert a lever effect as indicated in FIG. 8A: in this case, the edge of the hole constitutes what has been defined in the disclosure as a "bias plane".

Moreover, it is not excluded that the same holding clip can constrain a pair of elastic elements instead of a single coil spring, arranged for example one above the other so as not to negatively affect the transverse size.

Furthermore, the carriage can also have more than two eyelets, provided that the holding clip is accessible from the inlet mouth of the sliding cavity of the housing 1.

Finally, although a fork carriage having two side portions has been illustrated, the teaching of the invention can also be applied to a box-shaped carriage, wherein the holding clip is in any case accessible by a tool which is inserted from the inlet of the housing.

The invention claimed is:

1. An elastic hinge for eyeglasses comprising a component including
a box-shaped housing (1) provided with an inlet aperture,
a fork carriage (2), slidably mounted in a guiding cavity inside said box-shaped housing (1) in opposition to an elastic element,
elastic holding clip (4, 5, 6, 7, 9, 10, 11, 12, 13), snap-engageable with a retaining structure (1b) of said housing (1) cavity, against which one end of said elastic element abuts,
wherein said elastic holding clip has a generically C-shaped shape, which provides at least a resting arm (4b, 5b, 6b, 7b, 9b, 10b, 11b, 12b, 13b) and a flexible arm (4a, 5a, 6a, 7a, 9a, 10a, 11a, 12a, 13a) joined by a connecting portion (4f, 5f, 6f, 7h, 9i, 10i, 11f, 12f), said flexible arm being provided with engaging means (4a', 5a', 6a', 7a', 9a', 10a', 11a', 12a', 13a') configured to snap engage with said retaining structure (1b), said resting arm and flexible arm being elastically biased one towards the other by inner walls of said housing (1),
wherein said flexible arm (4a, 5a, 6a, 7a, 9a, 10a, 11a, 12a, 13a) is integral with at least one bias element, accessible from an inlet aperture of said housing (1), which defines bias planes (4e', 4d', 5e', 5d', 6e', 6d', 7e', 7d', 9e', 9d', 10e', 10d', 11d', 12d', 13d') to be engaged with a tool, introduced via said inlet, for imparting a disengaging bias configured to cause said flexible arm to bend towards said resting arm.

2. The elastic hinge of claim 1, wherein said bias planes (4e', 4d', 5e', 5d', 6e', 6d', 7e', 7d', 9e', 9d', 10e', 10d', 11d', 12d', 13d') are transversal to the bending plane of said flexible arm.

3. The elastic hinge of claim 1, wherein said engaging means (4a', 5a', 6a', 7a', 9a', 10a', 11a', 12a', 13a') are in the shape of an edge tooth of said flexible arm.

4. The elastic hinge of claim 1, wherein said elastic holding clip (4, 5, 6, 7, 9, 10) is obtained from cut and folded metal sheet.

5. The elastic hinge of claim 4, wherein said at least one bias element is in the shape of at least one side ear (4d, 4e, 5d, 5e, 6d, 6e, 7d, 7e, 9d, 9e, 10d, 10e) which projects orthogonally to said flexible arm on a plane parallel to the longitudinal axis of said holding clip.

6. The elastic hinge of claim 5, further comprising at least one release cut-out on said resting arm (4b, 5b, 6b, 7b, 9b, 10b, 11b, 12b, 13b) or on said at least one side ear (4d, 4e, 5d, 5e, 6d, 6e, 7d, 7e, 9d, 9e, 10d, 10e).

7. The elastic hinge of claim 6, wherein said at least one release cut-out results in the resting arm (9b) being split into two thin elements joined through said connecting portion (9i) to side portions (9e, 9d) provided with upper edges (9e', 9d') which define said bias plane.

8. The elastic hinge of claim 1, wherein said resting arm projects with a front tab (4c, 5c, 6c) configured to close a front part of said elastic holding clip.

9. The elastic hinge of claim 1, wherein said elastic holding clip (11, 12, 13) is obtained from a solid body with a generic C shape.

10. The elastic hinge of claim 1, wherein said elastic holding clip (4, 5, 6, 7, 9, 10, 11, 12, 13) is furthermore provided with at least a side flap (4f', 4f'', 5f', 5f'', 6f', 6f'', 7f', 7f'', 9f', 9f'', 10f', 10f'', 11f', 11f'') configured to be inserted into at least one side cut-out (2w) obtained on at least one of the two opposite sides of said carriage (2).

* * * * *